(12) United States Patent
Wenning et al.

(10) Patent No.: US 10,767,804 B2
(45) Date of Patent: Sep. 8, 2020

(54) LEAK-SEALING DEVICE AND METHOD AND SYSTEM FOR SEALING A LEAK

(71) Applicants: Bernd-Josef Wenning, Rhede (DE); Rene Loetters, Rhede (DE)

(72) Inventors: Bernd-Josef Wenning, Rhede (DE); Rene Loetters, Rhede (DE)

(*) Notice: Subject to any disclaimer, the term of this patent is extended or adjusted under 35 U.S.C. 154(b) by 0 days.

(21) Appl. No.: 16/324,633

(22) PCT Filed: Aug. 10, 2017

(86) PCT No.: PCT/EP2017/070362
§ 371 (c)(1),
(2) Date: Mar. 4, 2019

(87) PCT Pub. No.: WO2018/036838
PCT Pub. Date: Mar. 1, 2018

(65) Prior Publication Data
US 2019/0195413 A1      Jun. 27, 2019

(30) Foreign Application Priority Data

Aug. 23, 2016   (DE) .......................... 10 2016 010 237

(51) Int. Cl.
*F16L 55/12*       (2006.01)
*F16L 55/1645*     (2006.01)
(Continued)

(52) U.S. Cl.
CPC ...... *F16L 55/1645* (2013.01); *B63B 17/0036* (2013.01); *B65D 90/22* (2013.01);
(Continued)

(58) Field of Classification Search
CPC .. F16L 55/1645; F16L 55/134; F16L 55/1612
(Continued)

(56) References Cited

U.S. PATENT DOCUMENTS 1,860,855 A * 5/1932 Gardner ..................... F16K 7/10
                                                      138/93
1,946,138 A * 2/1934 Gardner ..................... F16K 7/10
                                                      138/93
(Continued)

FOREIGN PATENT DOCUMENTS

AU   2008243506 A2   3/2013
CN   103982745 A     8/2014
(Continued)

OTHER PUBLICATIONS

Chinese Patent Office, English translation of Search Report in corresponding CN2017800517607, dated Aug. 15, 2019, 2 pages.
(Continued)

*Primary Examiner* — James F Hook
(74) *Attorney, Agent, or Firm* — Hooker & Habib, P.C.

(57) ABSTRACT

A leak-sealing device for sealing a leak in a container, a tank and/or a pipe includes a housing-type carrier unit, at least one expandable sealing member provided on an end region of the carrier unit, which does not expand, or only a little, in the storage position thereof, and at least one fluid connection and/or at least one fluid-release unit which is coupled to the carrier unit in such a way that, during the supply of fluid, the leak-sealing member is at least partially filled and expanded with the fluid in the sealing position thereof by means of a fluid supply. A method for sealing a leak using the leak-sealing device and to a system including the leak-sealing device and a fluid-supply device utilizes a release unit for fluid release.

22 Claims, 7 Drawing Sheets

(51) Int. Cl.
*F16L 55/134* (2006.01)
*F16L 55/16* (2006.01)
*B63B 17/00* (2006.01)
*B65D 90/22* (2006.01)

(52) U.S. Cl.
CPC ......... *F16L 55/134* (2013.01); *F16L 55/1612* (2013.01); *B65D 2590/0075* (2013.01)

(58) Field of Classification Search
USPC .............................................. 138/93, 97, 98
See application file for complete search history.

(56) References Cited

U.S. PATENT DOCUMENTS

| | | | |
|---|---|---|---|
| 3,841,256 A | 10/1974 | Etchelecon et al. | |
| 4,155,373 A * | 5/1979 | DiGiovanni | F16K 7/10 137/15.15 |
| 4,329,132 A | 5/1982 | Melvold et al. | |
| 4,390,333 A | 6/1983 | Dubois | |
| 4,417,598 A * | 11/1983 | DePirro | E03F 7/04 137/2 |
| 4,492,095 A * | 1/1985 | Brister | F16K 7/10 137/13 |
| 4,509,343 A * | 4/1985 | Brister | F16K 7/10 137/317 |
| 5,099,868 A * | 3/1992 | Weber | F16L 55/124 137/15.15 |
| 6,263,896 B1 * | 7/2001 | Williams | F16K 7/10 137/15.15 |
| 6,543,486 B1 * | 4/2003 | Morris | F16L 55/1612 114/227 |
| 6,581,620 B2 * | 6/2003 | Babcock | F16L 55/134 137/15.15 |
| 9,016,321 B1 * | 4/2015 | Champlone | F16L 55/1141 138/93 |
| 2001/0047825 A1 * | 12/2001 | Williams | F16K 7/10 137/315.06 |
| 2007/0246115 A1 * | 10/2007 | Ord | F16L 55/134 138/93 |
| 2011/0308656 A1 | 12/2011 | Manoogian | |

FOREIGN PATENT DOCUMENTS

| | | |
|---|---|---|
| CN | 205261130 U | 5/2016 |
| DE | 232461 A1 | 1/1986 |
| DE | 240769 A1 | 11/1986 |
| DE | 3844485 C2 | 3/1993 |
| DE | 10331378 A1 | 5/2005 |
| GB | 320 | 10/1896 |
| GB | 2217591 A | 11/1989 |
| WO | 2009123383 A1 | 10/2009 |
| WO | 2018036838 A1 | 3/2018 |

OTHER PUBLICATIONS

Chinese Patent Office, English translation of first Office Action in corresponding CN2017800517607, dated Aug. 23, 2019, 4 pages.
European Patent Ofice, International Search Report dated Nov. 9, 2017 in corresponding PCT/EP2017/070362, 3 pages.

* cited by examiner

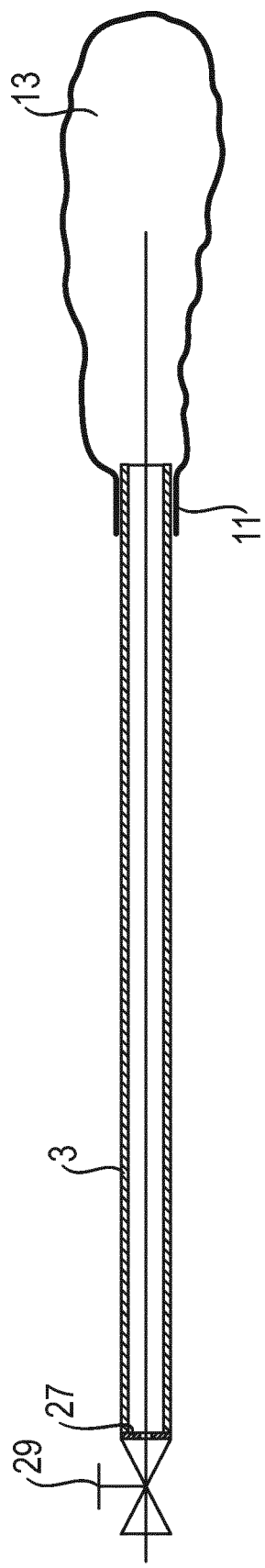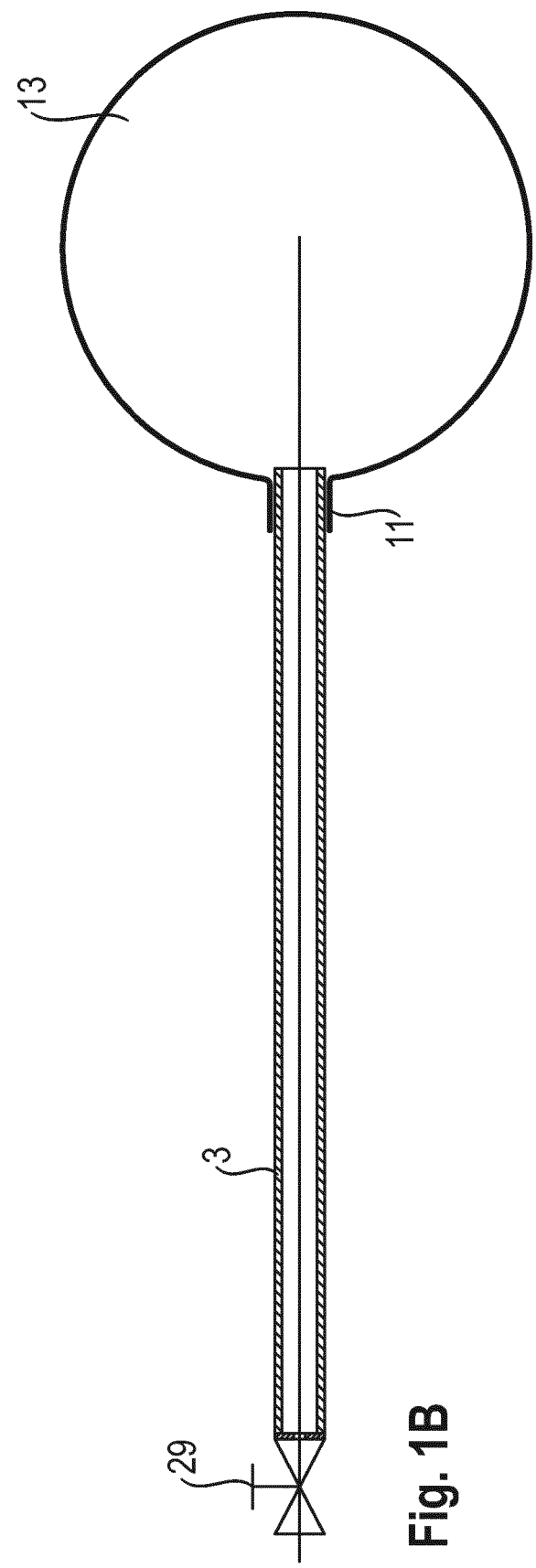

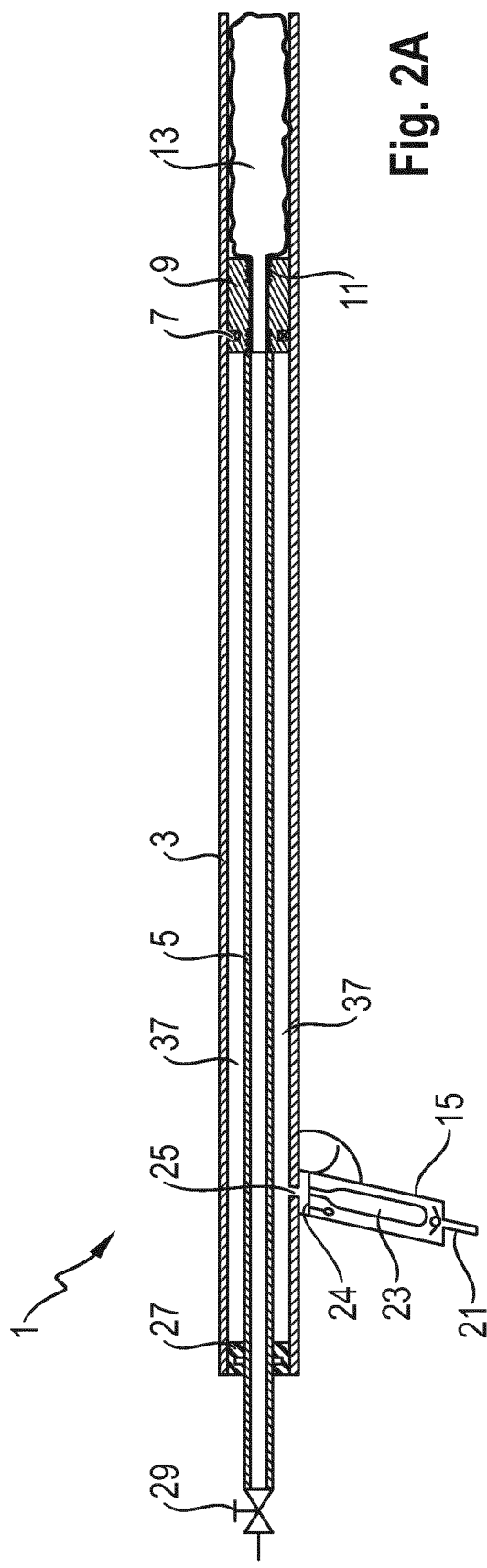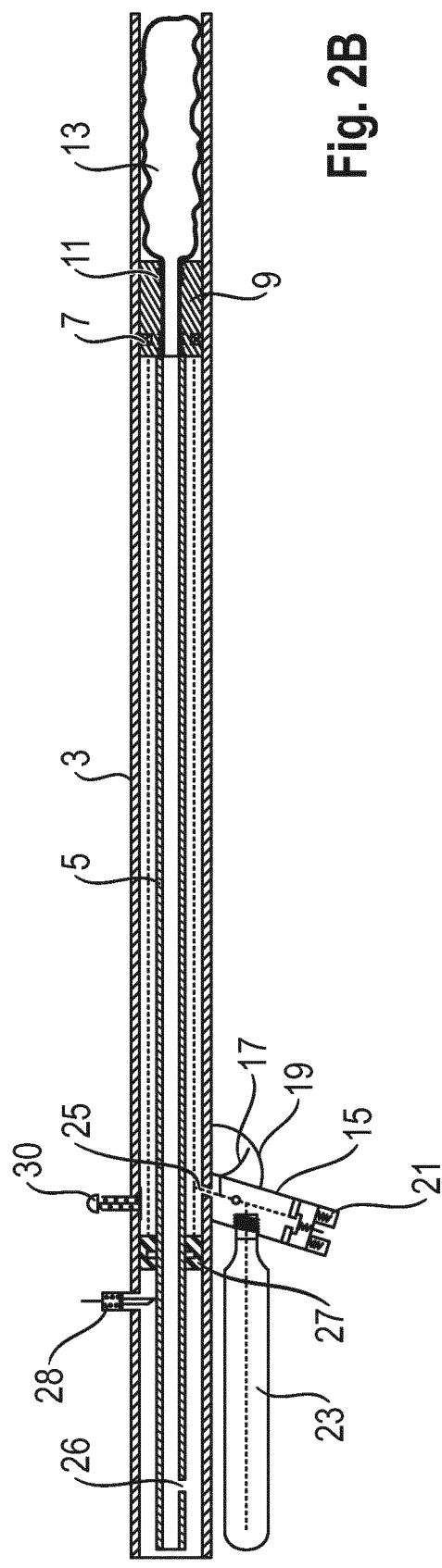

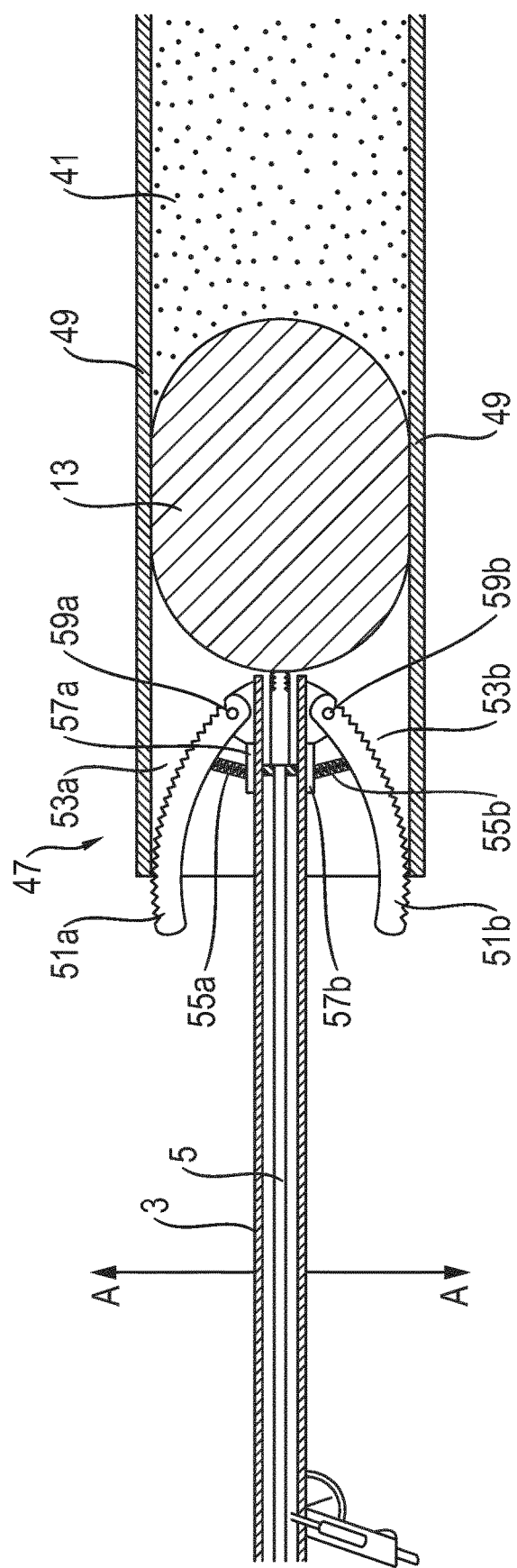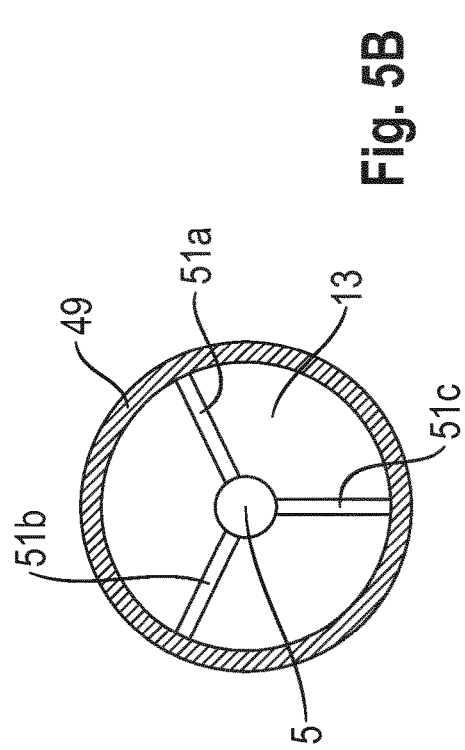

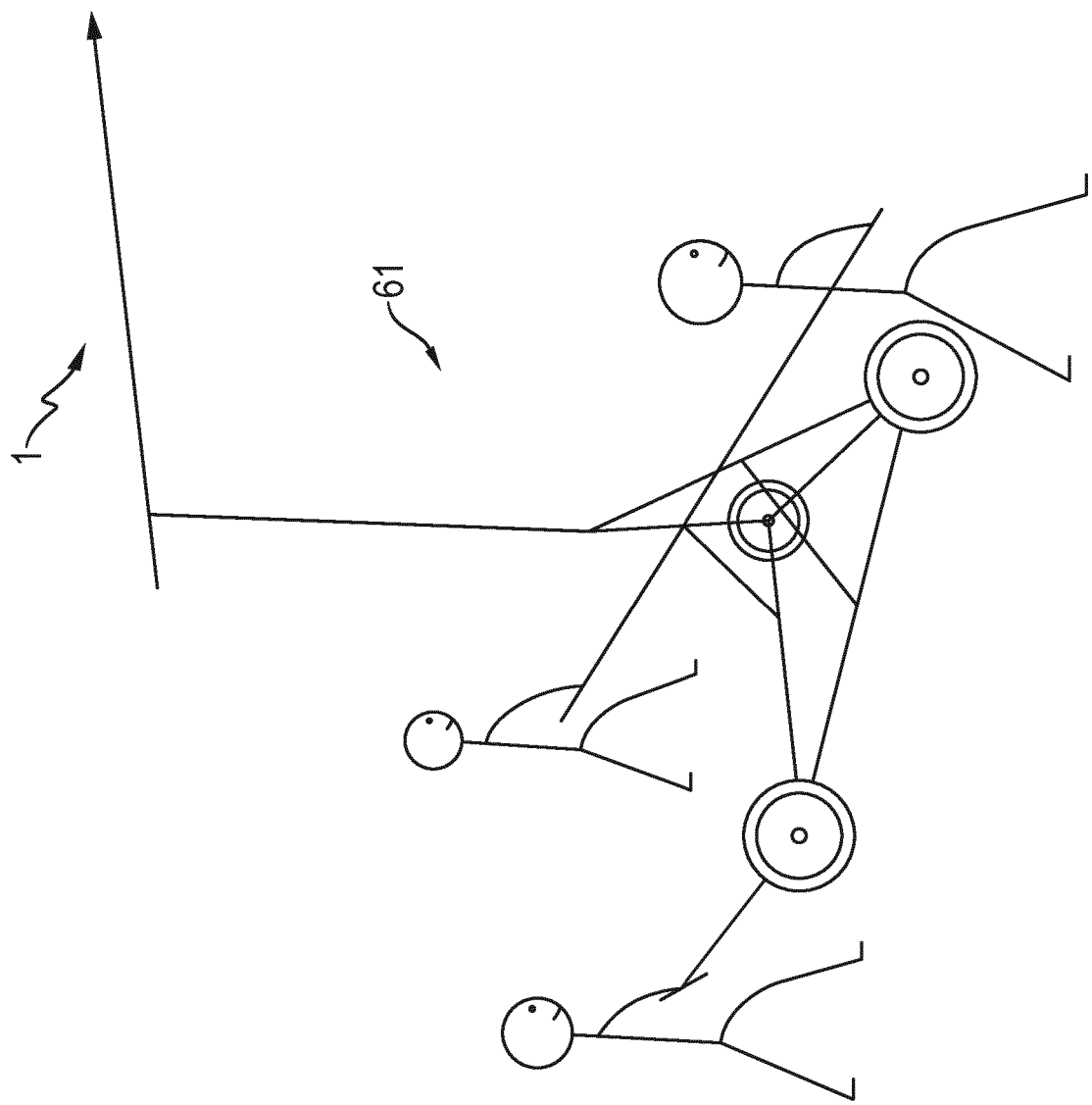

LEAK-SEALING DEVICE AND METHOD AND SYSTEM FOR SEALING A LEAK

FIELD OF THE DISCLOSURE

The invention relates to a leak-sealing device and its use and a method and system for sealing a leak in a container, tank and/or pipe.

The container can be, for example, a silo, a gas storage tank or gas container of a biogas plant, a fermenter or pipe or the like that contains a liquid and/or gaseous medium inside.

In these documents, location designations such as "top", "bottom", "bottom front", "bottom rear", etc. always relate to the point of view of a user or operator of the leak-sealing device, with a view of a leak-sealing device arranged transversely in front of him.

BACKGROUND OF THE DISCLOSURE

Devices for sealing leaks are known in various designs. For example, DD 240 769 A1 and DD 232 461 A1 each disclose a method for leak-sealing on hollow bodies. On pipelines with a leak, for example in the form of a crack or a bulge, the leak is sealed from the outside by gluing substrate material onto it. Since the media escaping through a leak are usually under pressure, these sealing methods are time-consuming and labor-intensive.

DE 103 31 378 A1 discloses a pneumatic leak-sealing by pressure reversal on closed containers and pipe systems. In practice, this type of leak-sealing is complex.

DE 38 44 485 C2 discloses a method for leak-sealing in pipelines, in particular, drinking water pipelines. To repair a leak, a drinking water supply is first taken out of operation and the pipeline is emptied using compressed air.

Such a method is not practicable for sealing a large gas and/or fluid container of a biogas plant, for example, since complete emptying or discharge of the fluid or gas into the environment is to be avoided.

Finally, A U 2008 243 596 A2 discloses a method for sealing a leak in a pipeline or borehole. The sealing in the pipe is done by a tubular body that can be inserted inside the pipe and is mechanically expanded by a mandrel.

This method is only intended for use with pipes and/or pipelines and the body can be inserted more easily when the pipeline or pipe is decommissioned.

All in all, known leak-sealing devices and methods are often inflexible in handling and complex in design. Sealing a leak from the outside is problematic with regard to reliable sealing, as the outflowing medium prevents or complicates sealing.

U.S. Pat. No. 4,329,132 A discloses a leak-sealing device in which a bag is fillable with a curable foam material and is arranged outside a supply device. The bag is held together by a rubber or rope in the non-sealing state.

U.S. Pat. No. 6,543,486 B1 discloses a leak-sealing device for sealing leaks, for example in a boat. Within a lancet-like structure, a tube is provided, at the front end of which an inflatable sealing device or bag is provided, which again is surrounded at its front end by a fragile cover.

U.S. Pat. No. 3,841,256 A discloses a device for sealing a leak in a boat wall in which a housing part is provided to be manually slidable for sealing.

SUMMARY OF THE DISCLOSURE

The problem addressed by the present invention is to provide another leak-sealing device and a system and method for sealing a leak which at least partially overcomes or at least reduce the above disadvantages.

This problem is solved by the items of the independent claims 1 and 13 to 15.

As in claim 1, the generic leak-sealing device thus has the following additional features: it comprises a housing-like carrier unit, at least one expandable leak-sealing means which is provided at one end region of the carrier unit and which is not expanded or only slightly expanded in its storage position, and at least one fluid connection and/or at least one fluid supply unit which is coupled to the carrier unit in such a way that, when fluid is supplied, fluid at least partially fills and expands the leak-sealing means in its sealing position with the fluid via a fluid supply line, wherein a longitudinally movably mounted piston unit is provided in the carrier unit, and the leak-sealing means is coupled to the piston unit and/or the carrier unit and the at least one fluid connection and/or the at least one fluid supply unit in such a way that, when fluid is supplied, the fluid advances the piston unit into the sealing position and at least partially fills the leak-sealing means via a fluid supply line.

The method for sealing a leak in a container, tank and/or pipe according to the invention comprises the steps: Inserting a leak-sealing device according to the invention at least partially into a leak in the container, tank and/or pipe, and at least partially filling and expanding the leak-sealing means with fluid such that the leak-sealing means from the interior of the container, tank and/or pipe is pressurized by the medium flowing out there against an inner wall of the container, tank and/or pipe and seals the leak.

The invention also comprises a system for sealing a leak in a container, tank and/or pipe comprising a leak-sealing device according to the invention and a fluid supply device provided with a release unit for fluid supply.

The invention also provides for the use of the leak-sealing device according to the invention to seal a leak in a container, tank and/or pipe.

Advantageously, the invention provides a simple design of a leak-sealing device, method and system designed in particular to prevent environmental disasters and environmental damage. The leak-sealing device is also referred to as a leak-stop pistol.

Fluid in the sense of the invention includes gaseous and/or liquid media of any kind and/or powder/granulate/sand of any kind as well as their mixtures.

Leaks in containers, pipes etc. can occur due to a variety of circumstances, such as a fallen tree, a falling branch, falling bricks, material fatigue, impact damage or other causes. For example, foreign bodies, such as stones or the like, which are introduced into the respective containers with the substances to be processed or converted during biogas production, for example, can damage a container from the inside.

The device, the method and the system are advantageously configured to seal leaks of any kind and are therefore flexible in use. In particular, their use is not restricted to pipelines or pipe-like lines carrying pressurized gas and/or fluid. Depending on the dimensions of the respective leak-sealing device, it can likewise be used flexibly to seal leaks in gas containers or tanks, for example, a biogas plant, or fluid containers of any dimensions. An insert can be used, for example, on trucks as tankers, on containers and tanks of various sizes, on boats and ships, in the field of liquid metal processing with very high temperatures, on all types of pipes such as wastewater, gas, CO2, nitrogen, oil, brine, liquid manure or on food pipes such as drinking water, milk, beer, wine, juices, Cola, Fanta and other beverage pipes, all of which can be sealed under existing pressure.

Altogether, the leak-sealing device can be provided in any suitable dimensions and lengths of the carrier unit, also known as a guide lance, with different dimensions of the at least one sealing means.

The device, method and system according to the invention are also suitable for a wide variety of applications. Depending on the dimensioning, they can, for example, be kept available for vehicles, tanker trucks, fire departments and biogas plant operators for use in the respective application.

The principle underlying the invention is that the leak-sealing device is inserted from the outside into a leak in a container, tank, etc. like a pistol, then the leak-sealing means is pressurized with a suitable gaseous and/or liquid fluid, for example, compressed air or carbon dioxide, and/or powder/granulate and their mixtures, and then the leak is sealed from the inside. The sealing means is "shot" into the escaping medium by means of the inflowing fluid or compressed air or carbon dioxide. In this process, the outflowing medium pressurizes the expanded sealing means from the inside of the container thus from the inside against the inside wall of the container.

Advantageously, a leak can be almost and/or completely closed and sealed with the device, method and system according to the invention, even while the medium is flowing out. The device, method and system are thus a kind of "first aid measure" for fast and flexible use in the event of leaks, so as to prevent major environmental damage.

After using the device according to the invention, the respective leak can be repaired appropriately.

The pressure for filling the sealing means only needs to be high enough to counter the outflowing medium from the container, pipe, tank or accumulator with higher pressure. For example, the pressure of an outflowing fluid, e.g. from a tank of a biogas plant, may be about 1.5 bar. If the fluid supplied to the leak-sealing device, e.g. compressed air or carbon dioxide, has a higher pressure, the sealing means can be filled in the outflowing medium. Overall, the required pressures of the fluid supply or of the fully or partially expanded or filled leak-sealing means can be adapted advantageously to the respective leak situation. Basically, the leak-sealing device can, therefore, be used for all pressures of the outflowing medium. At high pressures, appropriate special compressors are used to fill the sealing means.

Likewise, different fluids, whether gaseous or liquid, can be provided to fill the sealing means. This means that when sealing a gas pipe, for example, the sealing means is not filled with air so as not to unnecessarily increase a possible explosion limit and pose a hazard to the user.

Since each leak requires a different fluid to fill the sealing means, suitable fluids can be used flexibly in each case, e.g. carbon dioxide gas, compressed air, oxygen or other gases. Likewise, suitable liquids such as oils and/or powders/granulates and their mixtures or the like can be used. It is only necessary to ensure that the fluid supplied harmonizes with the outflowing medium, i.e. a dangerous mixture which, for example, creates a risk of explosion, such as a combination of oxygen and methane and/or other substances is prevented.

The leak-sealing means can, for example, be provided in the form of a balloon, so that after being advanced out of the device it fills up inside the container and is then pressed from the inside against the leak by the pressure of the outflowing medium in such a way that it is sealed. By applying a tensile force to the leak-sealing device away from the container, sealing of the leak can be improved and, in particular, the seat of the sealing means can be adapted to the container.

The carrier unit can have any suitable geometric design, e.g. angular, round, rectangular or other. In practice, a tubular design has proven to be flexible. The tubular design of the carrier allows easy insertion into a leak.

The carrier unit is advantageously made of sturdy but lightweight material to ensure easy handling and fast deployment to the site of use. The material can, for example, be an impact-resistant plastic, a metal such as aluminum or a metal alloy, or a composite material. The sealing means is made of a flexible and expandable material such as plastic or plastic composites. Carbon or carbon fabrics (for extremely hot materials) and glass fiber can also be used. The choice of material is such that the sealing means can be filled like a balloon and, in particular, can be stretched in order, for example, to fit better on broken edges of the leak. The material depends on the intended use and, if necessary, has a certain cut resistance.

The at least one fluid supply unit can be designed as a carbon dioxide cartridge or compressed air cartridge, for example, so that the leak-sealing device can be used independently and does not require an external fluid source.

Alternatively, or additionally, a fluid connection can be provided, which can be coupled for example with an external compressed air system, a compressor, a gas cylinder, a liquid container or similar suitable means to fill the respective sealing means. With the system according to the invention, a release unit provided at the compressed air system, the compressor, the gas cylinder etc. can be actuated for fluid release, so that no release unit is required at the leak-sealing device. One or more fluid connections and one or more fluid supply unit(s) may also be provided side by side as required.

Overall, the leak-sealing device, system and method according to the invention provide a flexible device and method to seal both leaking containers and tanks as well as leaking pipes. In this way, they prevent leaking containers or storage tanks from emptying completely and thus causing environmental disasters. In particular, the leak-sealing device, the system and the method are suitable both for countering and stopping the leak of the medium flowing under pressure and for countering and adapting to the mostly irregularly drawn or formed leak outlet openings through which the medium escapes.

Preferably, the leak-sealing device further comprises a piston unit mounted in the carrier unit so as to be movable longitudinally, the leak-sealing means being coupled to the piston unit and/or the carrier unit and to the at least one fluid connection and/or the at least one fluid supply unit in such a way that, when fluid is supplied, the fluid advances the piston unit into the sealing position and at least partially fills the leak-sealing means via a fluid supply line.

The leak-sealing means is movably mounted between a storage position, in which the leak-sealing means is at least partially located inside or outside the carrier unit, and a sealing position, in which the leak-sealing means for sealing the leak is at least partially located outside the carrier unit.

Storage of the leak-sealing means at least partially within the carrier unit protects the leak-sealing means from damage. The piston unit ensures that the piston is advanced into the sealing position.

The piston unit and the leak-sealing means can be advanced and filled simultaneously. It is preferable to first advance the piston unit with the leak-sealing means and then fill the leak-sealing means.

The leak-sealing device preferably comprises at least one release unit for holding the leak-sealing device and for actuating the at least one fluid connection and/or the at least one fluid supply unit for fluid supply.

The release unit can, for example, be integrally provided at or coupled to the carrier unit in the manner of a pistol grip. The release unit may include a trigger mechanism. When the trigger is actuated, the at least one fluid connection and/or the at least one fluid supply unit can be triggered for fluid supply. For example, the fluid supply unit can be triggered in the manner of a fire extinguisher and when the trigger is actuated, a seal or opening of the fluid supply unit, for example by pulling off a sealing strip, can be released so that fluid can flow out.

In the case of the leak-sealing device, the at least one fluid connection and/or the at least one fluid supply unit can preferably be connected to a fluid supply line coupled to the piston unit or integrated therein for filling the leak-sealing means.

This measure ensures a safe filling of the leak-sealing means.

The leak-sealing device preferably comprises at least one second fluid connection or at least one second fluid supply unit for advancing the piston into the sealing position.

This measure enables flexible handling and variable use of the leak-sealing device.

Preferably, the leak-sealing device further comprises at least one second release unit for releasing the second fluid connection or the second fluid supply unit for fluid supply.

With this measure, the second fluid connection or the second fluid supply unit can be variably used and controlled.

The carrier unit and/or the piston unit of the leak-sealing device are preferably designed in one piece.

This allows a structurally simple design.

Preferably, in the leak-sealing device, the carrier unit and/or the piston unit is designed in several parts.

With this measure, the dimension of the leak-sealing device, in particular, can be varied and the leak-sealing device can be dismantled, e.g. for transport.

The leak-sealing device preferably comprises at least one insertion aid for inserting the leak-sealing device into the leak, which, in the storage position, at least partially surrounds the leak-sealing means and, in the sealing position, allows the leak-sealing means to be filled.

The insertion aid reduces the resistance when the leak-sealing device penetrates the medium and thus allows easier penetration. In addition, the insertion aid serves to protect the leak-sealing means and also helps to prevent greater drift of the leak-sealing means within the leak.

At least one insertion aid may be made of suitable materials such as plastic, polyester, heat-resistant material such as carbon fiber, glass fiber or similar materials. The material selection depends on the application.

Preferably with the leak-sealing device, the at least one insertion aid comprises at least one sliding tip and at least one sliding shell for inserting the leak-sealing device into the leak.

After advancing out, the sliding shells and the sliding tip can simply fall away laterally or downwards, as they can be attached to the leak-sealing means. These measures allow the sealing means to be freely filled and expanded.

Preferably, the leak-sealing device further comprises at least one recoil protection device for defining the leak-sealing device in a container, in particular in a pipe, wherein the recoil protection device can be provided detachably connectable to the leak-sealing device.

The recoil protection can also be mounted depending on the location. A suitable coupling mechanism can be provided for this purpose, e.g. by means of suitable fasteners such as clamps or sleeves and screws. The recoil protection is preferably self-locking so that the leak-sealing device is not advanced out of the pipe by the escaping medium when the pipe is used.

Preferably, in the leak-sealing device, the recoil protection comprises at least two self-clamping or clamping retaining arms, which are spring-loaded, pretensioned and/or the surface of which is provided to be slip-resistant.

This measure is a simple and cost-effective design of the recoil protection. The arms can be mounted individually or together on the side of the carrier unit and are then supported, for example, spring-loaded on the inner surface of the pipe. Surface treatment of the arms can provide an anti-slip texture, e.g. grooves, scores, fish skin texture, etc. Alternatively, or additionally, a slip-resistant coating can be applied or coupled to the arms, e.g. a rubber layer. Since the medium from the container pressurizes the leak-sealing device and thus on the recoil protection, it wedges itself self-locking, especially in the pipe.

Preferably, the leak-sealing device also includes a connection interface for mounting on a stand or mount.

This measure enables fast and flexible mounting on a mount or stand and thus extends the range of application of the leak-sealing device.

Preferably, the leak-sealing device also comprises a mount or stand on which the leak-sealing device can be mounted.

The mount or stand can be mobile which makes its use easier. It is also possible, for example, to motorize a mount or stand and remotely control it if necessary, so that no users are endangered if toxic or dangerous media escape. In addition, a mount or stand allows flexible use, as leaks can also be sealed at different heights.

BRIEF DESCRIPTION OF THE DRAWINGS

Exemplary embodiments of the invention are explained below with reference to the attached schematic drawings. The figures show:

FIG. 1A a longitudinal sectional view of a leak-sealing device according to the invention in a view from the side.

FIG. 1B a longitudinal sectional view of the embodiment of FIG. 1A with an expanded sealing means in the sealing position;

FIG. 2A a longitudinal sectional view of another embodiment of the leak-sealing device according to the invention in a storage position in a view from the side;

FIG. 2B a longitudinal sectional view of another embodiment of the leak-sealing device according to the invention in a storage position in a view from the side;

FIG. 5A a longitudinal sectional view of another embodiment of the leak-sealing device according to the invention for sealing a leak in a pipe in the sealing position;

FIG. 5B a cross-sectional view of the embodiment from Fig. A along the sectional plane A-A from behind; and FIG. 6 a perspective representation of a further embodiment of the leak-sealing device according to the invention, in which a leak-sealing according to the invention is mounted on a stand or a mount.

DETAILED DESCRIPTION

Figure 2C:
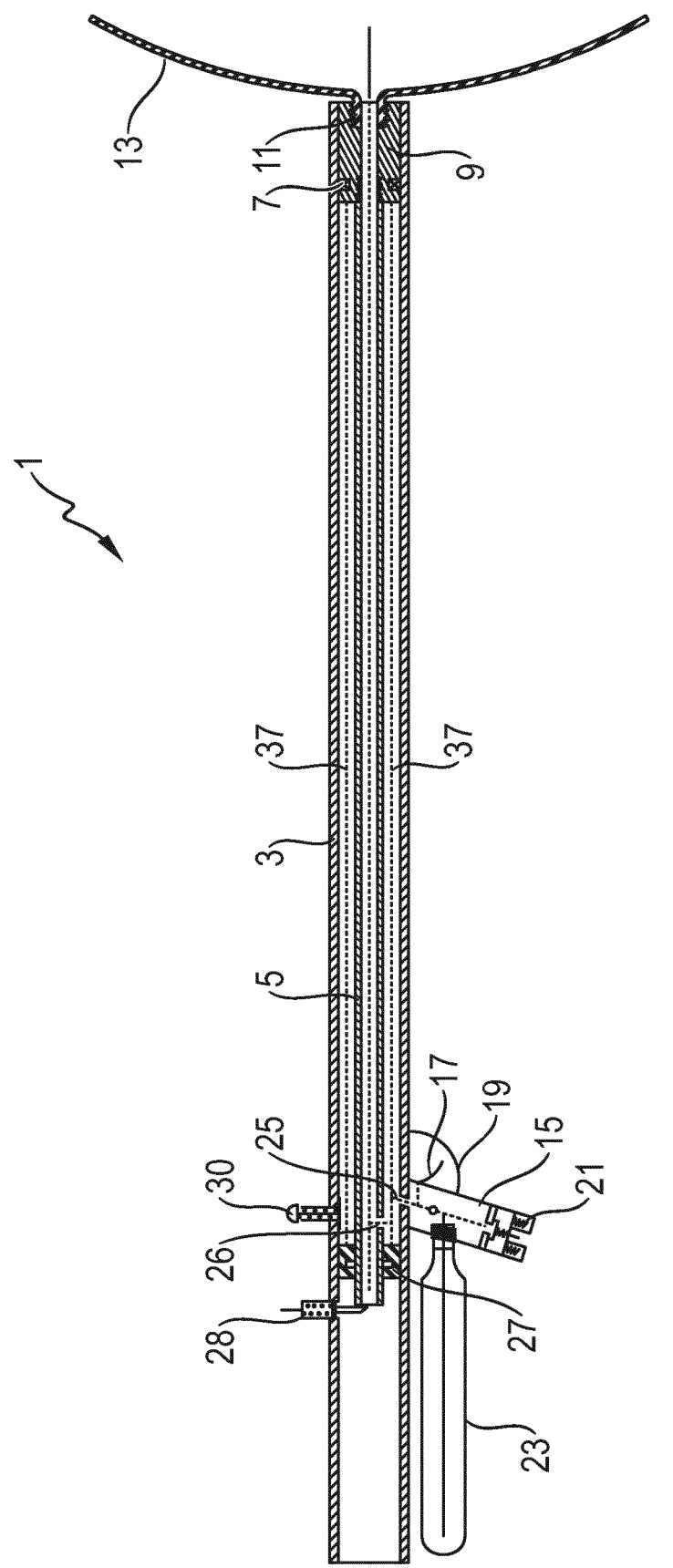
FIG. 2C a longitudinal sectional view of the embodiment of the leak-sealing device of FIG. 2B having an expanded sealing means in the sealing position.

The configuration of a leak-sealing device 1 is first explained on the basis of the embodiment in FIGS. 1A and B. FIG. 1A shows the leak-sealing device 1 in its storage position and FIG. 1B in its sealing position.

The leak-sealing device 1 comprises a tubular carrier unit 3 extending longitudinally. A fluid connection 29 in the form of a valve is provided at the rear end of the carrier unit 3. The fluid connection 29 is used to connect the leak-sealing device 1 to a fluid source (not shown), such as an external compressor or a fluid cartridge or gas cylinder (not shown) in which a gaseous or liquid and/or powdery fluid for filling the sealing means 13 is stored.

The fluid either has the pressure required for the respective application in the fluid reservoir or can be put under the required pressure via additional devices such as the compressor. In addition, a seal 27 can optionally be provided to seal the fluid connection 29. The fluid supply is illustrated schematically from the fluid connection 29 to the sealing means 13.

At the front of the carrier unit 3, the sealing means 13 is connected to the carrier unit 3 by a fastener 11, such as a threaded section or other suitable attachment. In the storage position shown here, the sealing means 13 is provided as an unfilled balloon surrounding the carrier unit 3. The sealing means 13 can also be attached in the storage position inside the carrier unit 3. Alternatively, the sealing means 13 in the storage position can also be completely or partially inside the front end of carrier unit 3 and flush with it or protrude partially.

FIG. 1B shows the design according to FIG. 1A in the sealing position. After actuation or release of the fluid source, the gaseous or liquid fluid is fed into the carrier unit 3 either via the fluid cartridge or the fluid connection 29. The sealing means 13 is filled and expanded by the pressure of the supplied fluid.

FIG. 1B shows the fully filled sealing means 13 or sealing means 13 held to the carrier unit via fastener 11.

Figure 4:
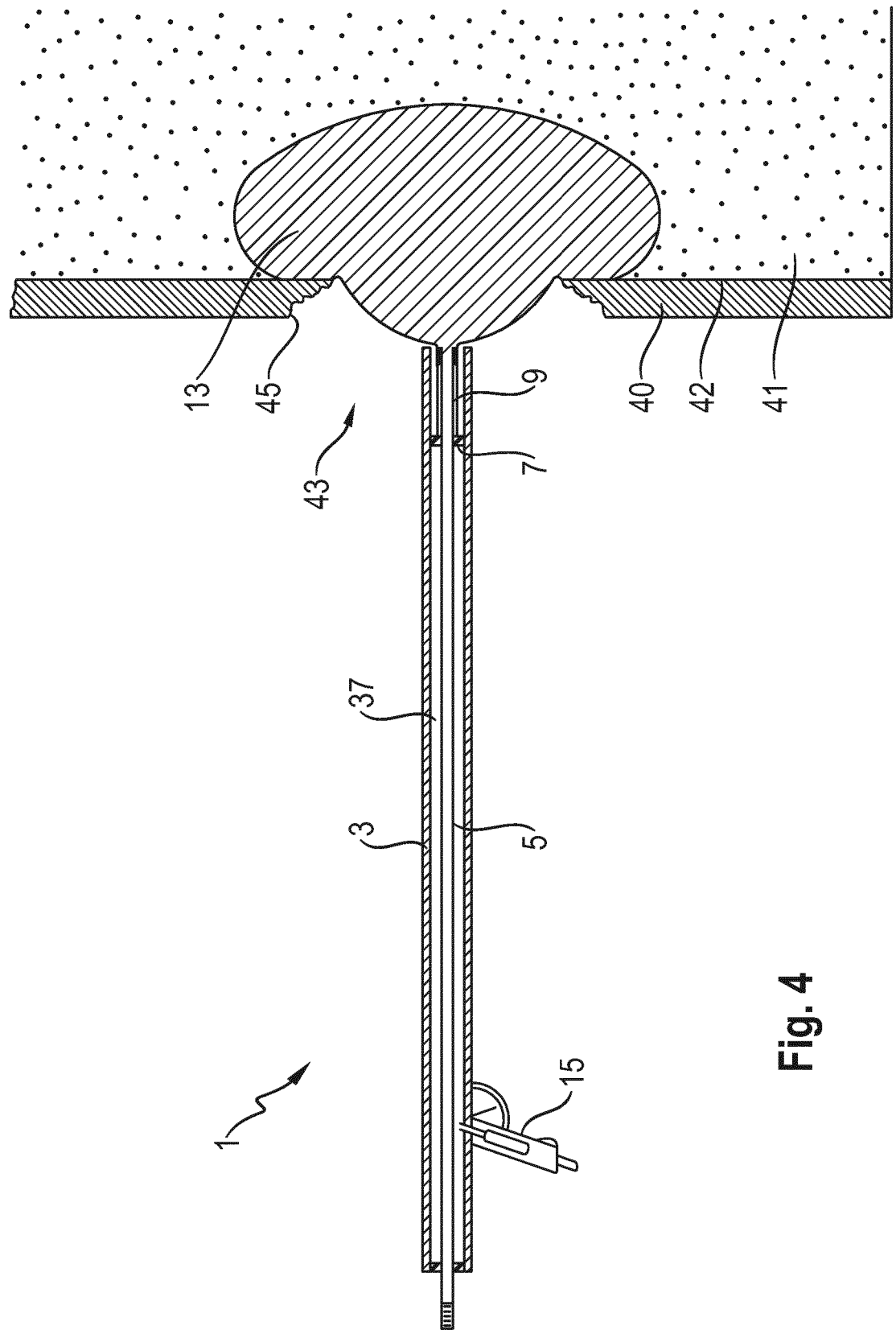
FIG. 4 a longitudinal sectional view of the embodiment of FIGS. 3A-3C in the sealing position in which the sealing means seals a leak in a container.

The basic principle of the invention is that the leak-sealing device 1 is inserted into a leak in its storage position, then the sealing means is filled with a suitable fluid and in the sealing position the medium flowing out of the leak presses the sealing means 13 from the inside against the leak and thus the leak is sealed (see also FIGS. 4 and 5).

FIGS. 2A and B show the storage position of two further leak-sealing devices and leak-stop pistols 1. These also include the tubular carrier unit 3.

A piston unit 5, 9, movable in a longitudinal direction, is provided within each carrier unit 3. It comprises a piston section or piston rod 5 and a piston section or piston 9, which may be provided in one piece or in several parts and are coupled together. Inside, the piston section 5 comprises a fluid supply line extending to its front right end in the figure. A sealing means 7, preferably an elastic sealing means such as a rubber stopper or a comparable design, is provided inside the carrier unit 3, surrounding the piston section 9.

At the front of the leak-sealing device, also called leak-stop pistol 1, the piston section 5 widens into a piston section 9. The two piston sections are coupled to each other by means of suitable fasteners, in this case by means of a threaded connection. At the end of the piston section 9, the sealing means 13 is connected to the piston section 9 via a fastener, in this case, a threaded screw connection 11.

In these two embodiments, the sealing means 13 is provided in the storage position as an unfilled balloon, for example, folded. In the storage position, it extends to the front end of carrier unit 3 and is flush with it. Alternatively, it can partially protrude from the carrier unit 3.

At the bottom of the carrier unit, which is also known as guide lance 3, there is a pistol grip-type trigger device or holding device or release unit 15 provided it can be formed in one piece with the carrier unit 3 or separately and connected with the carrier unit 3. The release unit 15 comprises a trigger 17 that is protected against unintentional operation by a trigger guard 19.

Inside the release unit 15, a fluid cartridge, in particular, a carbon dioxide cartridge 23, is provided as the fluid release unit, which is coupled via a fluid supply line 25 to a compression space 37 provided inside the carrier unit 3. The compression space 37 extends over the entire inside of the carrier unit 3 up to the seal 7. With its fluid as ejection medium, the carbon dioxide cartridge 23 ensures that the sealing means (sealing ball) 13 is moved out of the carrier unit/guide lance 3, which takes place via the compression space 37. This process is triggered mechanically by hand by actuating the trigger 17 which opens the carbon dioxide cartridge 23 by removing a seal or sealing strip 24 from its top side, similar to a fire extinguisher, and empties it completely.

In addition, a fluid connection 21 is provided at the release unit 15 for the connection of an external fluid source, such as compressed air or other gas source or liquid source. The fluid connection 21 can also be provided as an alternative to the fluid cartridge 23. In the present case, however, both are provided. The fluid cartridge 23 ensures autonomous operation of the leak-sealing device or leak-stop pistol 1. The fluid connection 21 allows a connection to an external fluid source, such as a compressor or similar units, which can supply pressurized fluid.

A seal 27 sealing the inside space, in particular, the compression space 37 of the carrier unit 3, is provided at the rear end of the carrier unit 3 and is penetrated by the piston section 5 such that the piston section 5 partially protrudes rearwards in the storage position. At the rear end of the piston section 5 with its fluid supply line inside, a further fluid connection 29 is optionally provided, via which the sealing means or the sealing ball 13 can be filled.

If the sealing means (sealing ball) 13 is advanced out of the carrier unit/guide lance, the sealing means 13 is filled with the appropriate fluid via connection 29 up to its optimum sealing pressure in the design according to FIG. 2A in order to close the leak. This process is controlled via a pressure control valve 29 and monitored at the same time. The pressure control valve is located at the fluid connection 29.

The embodiment according to FIG. 2B differs from the embodiment according to FIG. 2A in that the carbon dioxide cartridge or fluid source 23 is provided with larger dimensions and is partially arranged outside the trigger device or holding device 15. In addition, a second fluid connection or a pressure relief valve 21 is optionally provided in this embodiment. The pressure relief valve 21 is used to automatically release and regulate any excess pressure in the compression space 37 and/or the sealing means 13. When fluid is released or supplied via the carbon dioxide cartridge or fluid source 23, the supplied fluid first fills the compression space 37 via the fluid supply line 25 and drives the piston section 9 with the sealing means out of the carrier unit 3. The piston section 5 penetrates the sealing means 27, which is provided in the storage position approximately close to and above the trigger device 15. The sealing means 27 delimits the compression space 37 to the rear and seals it.

Via the fluid supply, the expanding fluid pressurizes the piston unit 5, 9 and advances the piston sections 5, 9 and the sealing means 13 to the front (see FIG. 2C). The piston section 5 is advanced so far that in the sealing position its fluid supply 26 passes the sealing means 27 so that the fluid can penetrate the fluid line 5 via the further fluid supply 26 and fill the advanced sealing means 13.

The fluid pressure(s) within the sealing means 13 and within the compression chamber 37 can be controlled via a valve unit 30 either independently of each other or jointly by fluid discharge to the outside so that in particular the volume of the sealing means 13 can be adjusted as required.

This measure can be applied to all embodiments of the invention and can be varied in any known way.

FIG. 2C shows the completely filled sealing ball 13, which is connected to the piston section 9 via thread 11 and held there. The piston section 5 is connected to the compression space via the fluid supply line 26. In addition, recoil securing 28 in the form of a spring-loaded bolt is provided. In the storage position, the bolt 28 rests spring-loaded on the piston section 5. If the piston section 5 is now advanced into the sealing position as shown in FIG. 2C and passes by the bolt 28, the spring can push the bolt 28 into the release unit 3 so that the bolt 28 secures the piston section 5 at its rear end and secures it against unintentional movement into its storage position as well as preventing it from moving out or moving in the carrier unit 3.

A further embodiment of the leak-sealing device 1 according to the invention is now explained using FIGS. 3A to 3C and 4. The embodiment of the leak-sealing device 1 shown in FIGS. 3A to C and FIG. 4 differs from the embodiment according to FIGS. 1A and B as well as 2 A to C in that at the front end sliding shells 31 a, 31 b and a sliding tip 33 are provided as insertion aids.

Figure 3A:
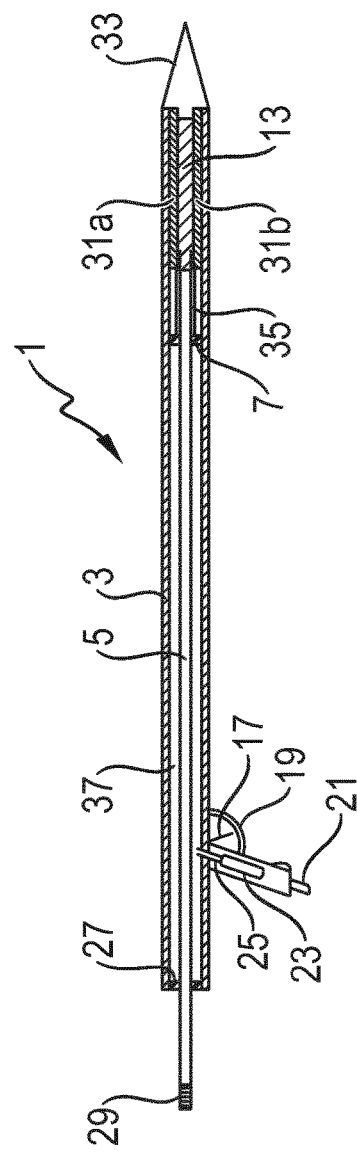
FIG. 3A a longitudinal sectional view of another embodiment of the leak-sealing device according to the invention in a storage position in a view from the side.

FIG. 3A shows the storage position of the leak-sealing device 1, in which the sliding shells 31a, b are completely accommodated and the sliding tip 33 partly within the carrier unit 3. The sealing means or the balloon 13, respectively, is also completely absorbed within the carrier unit 3 and is covered at its front end by the arrow tip-like sliding tip 33 and thus protected against damage. The sliding tip can also have alternative geometric designs, such as a rounding or hemispherical shape or the like and facilitates the insertion of the leak-sealing device into the leak.

The sliding tip 33 is held in the storage position by a form fit and/or press fit or other suitable measures. For example, it can also be secured by a type of clamping ring (not shown). Alternatively, the sliding tip can also be secured with an adhesive with very low adhesive strength. This securing of the sliding tip 33 gives way when pressure is built up by the advancement fluid so that the clamping ring/form fit together with the sliding tip can escape unhindered to the front and the sealing means 13 can freely enter the leak.

Figure 3B:
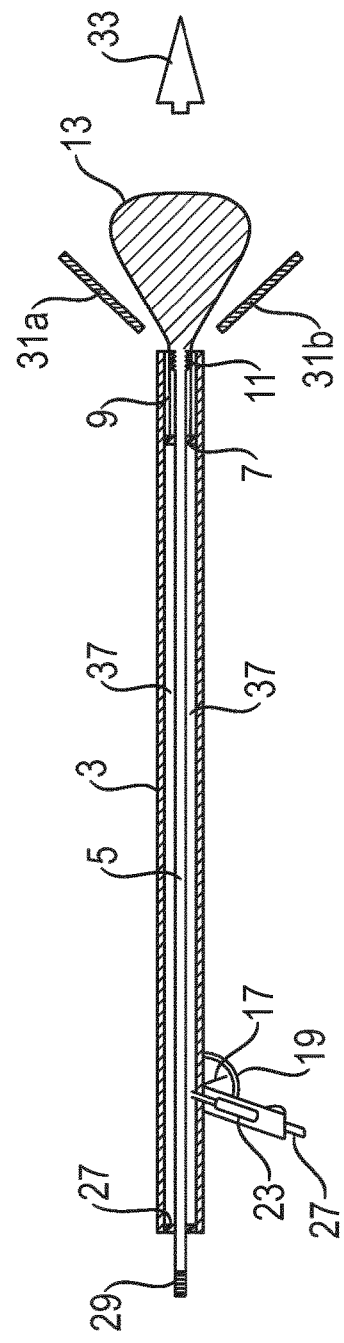
FIG. 3B a longitudinal sectional view of the embodiment of FIG. 3A with an expanding sealing means in the sealing position.

FIG. 3B shows the embodiment according to FIG. 3A in the sealing position with a partially filled sealing ball 13. After the trigger 17 has been actuated, a gaseous or liquid fluid is supplied either via the fluid cartridge 23 or the fluid connection 21 into the compression space 37 inside the carrier unit 3 via the fluid supply line 25. The piston sections 5, 9 are advanced by the resulting pressure of the supplied fluid, whereby the sealing means 13, the sliding shells 31 a, 31 b and the sliding tip 33 are advanced out of or moved out of the carrier unit 3.

The piston or the fluid line 5 provided therein is used for filling the sealing means 13 with fluid. For this purpose, the fluid connection 29 is coupled to an external fluid source, such as a compressor (not shown) or another fluid supply unit (not shown). The inflowing fluid fills the sealing means 13 and the quantity and pressure can be controlled via a valve not shown.

The pressure of the fluid inside the compression space 37 and inside the fluid supply line of the piston section 5 is high enough to withstand the pressure of the outflowing medium 41. For example, at an internal pressure of the outflowing medium 41 of 1.5 bar, the fluid pressure for advancing the piston 9 and filling the sealing ball 13 can be slightly higher than 1.5 bar. The fluid advancing the sealing ball 13 and piston 9 is selected depending on the outflowing medium 41.

When filling the sealing means or balloon 13 and driving out the piston sections 5, 9 the sliding shells 31 a, 31 b and the sliding tip 33 are pushed out of the carrier unit 3. Since these are only loosely attached to the folded sealing ball 13 in the storage position, they can now fall off the sealing ball. The sliding shells 31 a, b and the sliding tip 33 thus act as insertion aids and secure the sealing ball from damage.

Furthermore in FIGS. 3B and C the piston section 9 is in its front-end position in which it is more or less flush with the front end of the carrier unit 3. Due to this forward movement of the piston section 9, the piston section 5 is simultaneously inserted further into the carrier unit 3, so that the rear end of it protrudes only slightly.

Figure 3C:
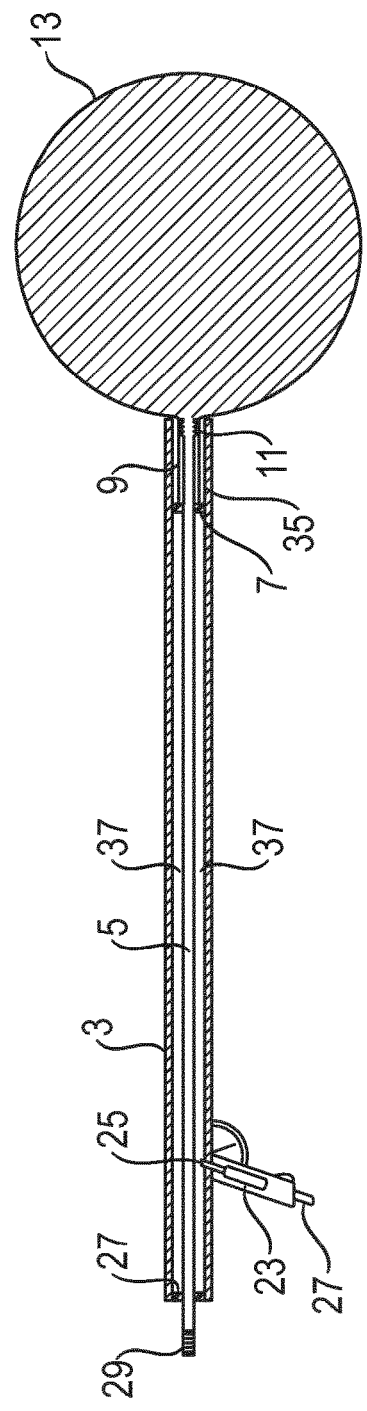
FIG. 3C a longitudinal sectional view of the embodiment according to FIGS. 3A and 3B in the supply position with completely filled and expanded sealing means.

FIG. 3C shows the completely filled sealing ball 13 connected to the piston section 9 via fasteners 11 and held there. The piston section 9 is coupled to the piston section 5 via a threaded section or accompanying piece 35, respectively. Alternatively, these two elements can also be designed in one piece.

FIG. 4 shows the embodiment of FIGS. 3A to C in the sealing position. As illustrated, the leak-sealing device 1 is first inserted into the leak 43 of a container 40 and then released via the trigger mechanism 15. The sealing ball 13 is made of a sufficiently elastic and tear-resistant material so that it is not damaged by crack edges 45 of the leak 43.

After filling the sealing ball 13, it is pressed against the leak 43 via the internal pressure of the container 40 by the medium 41 present therein, which is for example gaseous or liquid, which leads to a flattening of the surface of the sealing ball 13, so that it extends over the outer circumference of the leak and surrounds the leak 43 on both sides, is supported against the inner wall 42 of the container 40 and thereby seals the leak completely or partially.

In order to improve the sealing effect, the leak-sealing device 1 is partially pulled out of the container, for example by a user pulling it back or returning it mechanically, which leads to a distortion of the sealing ball 13 in the leak 43, so that the crack edges 45 are at least partially covered by the sealing ball 13. This improves the sealing effect of the leak-sealing device 1 and in particular of the sealing ball 13.

FIG. 5A shows another embodiment of the leak-sealing device or leak-stop pistol 1 according to the invention. It is provided for the sealing of pipelines 49 and differs in its configuration from the previous embodiments of the invention in that recoil protection 47 is provided. With pipes 49, the problem arises that the sealing ball 13 could possibly be advanced out of the pipe by the outflowing medium 41 and that the leak-sealing device 1 must be held against the pressure of the outflowing medium 41 either manually or mechanically.

FIG. 5A shows the sealing position of the leak-sealing device 1, in which the leak-sealing device 1 is inserted into a pipe 49 and the sealing ball or sealing means 13 is completely filled with the fluid (see FIG. 3A to 3C).

The recoil protection mechanism 47 is effective after the leak-sealing device 1 is fully or partially inserted into the pipe 49. The recoil protection 47 comprises three securing arms 51a, b and c, which extend in an even angular distribution over the inner diameter of the pipe.

The arms 51 a, b, c can be connected to the front end of the carrier unit 3 of the leak-sealing device 1 via a mounting interface. For this purpose, the mounting interface 57a, b is placed from the front on the carrier unit so that a sleeve-like section of the mounting interface 57 completely encloses the front end of the carrier unit 3. The sleeve-like section corresponds in its inner dimensions to the outer dimensions of the carrier unit 3 and is designed according to the geometry of the carrier unit 3, i.e. angular, round, etc. The mounting interface 57 can be detachably coupled to the external surface of the leak-sealing device 1 via a press fit or form fit and/or additionally via fasteners such as screws.

Alternatively, the mounting interface 57 can also be welded, glued or fastened to the front end of the carrier unit 3, for example. The arms 51a, b and c are each movably hinged to the mounting interface 57 via hinge pins or hinge connections 59a, b and c. In addition, elastic means are provided, in the present embodiment springs 55a, b and c, which pretension the arms 51a, b and c spring-loaded to the outside, i.e. when the leak-sealing device 1 is inserted into the pipe 49, the springs 55a, b and c are compressed, as the arms 51a, b and c are compressed, i.e. in the direction of the carrier unit 3. The springs 55a, b and c then press the arms 51a, b and c inside the pipe 49 against the inner surface of the pipe, whereby an increasing pressure inside the pipe ensures that the arms 51a, b and c wedge themselves more and more tightly in the pipe 49, securing the leak-sealing device 1 there and thus ensuring safety.

The arms 51a, b and c have an anti-slip surface 53a, b and c on their outer side, i.e. the side facing the pipe 49. This can be achieved by an anti-slip material, such as a coating, or by a mechanical design of the surface of the arms 51 a, b and c, such as a serrated or latching design. In addition, the arms 51 a, b, c are self-locking, braced and secured inside the pipe 49.

In conjunction with the slip-resistant surfaces 53a, b and c, self-locking of the recoil protection 47 within the pipe 49 is thus achieved, so that the leak-sealing device 1 is securely held within the pipe 49 and the sealing ball 13 can develop its full sealing effect against the outflowing medium 41.

FIG. 5B shows a top view of a cross-sectional representation along the section AA of FIG. 5A from behind. The arms 51a, b, c are shown schematically and are self-locking against the inner surface of the pipe 49 as shown in FIG. 5A. The piston section respectively the fluid supply line 5 is also shown as well as the sealing ball 13.

FIG. 6 shows an alternative embodiment of the invention, in which the leak-sealing device 1 is illustrated schematically and is mounted on a mount or stand 61. The mount or stand 61 is used to insert the leak-sealing device 1 into leaks that may be located at different heights of a tank, for example.

The stand or mount 61 can be moved manually to the container or tank to be sealed by several users or mechanically using a suitable machine, for example, and its height can be adjusted variably. This embodiment can be particularly helpful in the case of toxic outflowing gases in order to insert the leak delivery device mechanically into the respective leak.

Further embodiments of the invention will become apparent to those skilled in the art within the scope of the following claims and the attached figures.

What is claimed is:

1. A leak-sealing device for sealing a leak in a container, tank and/or pipe comprising:
   a housing-like carrier unit comprising a tubular body extending longitudinally between opposite front and back ends and a seal being disposed in the body, the seal fluidly separating the back end of the body from the front end of the body,
   a piston unit being disposed in the tubular body, the piston unit comprising a piston and a tubular piston rod attached to the piston, the piston being disposed between the seal and the front end of the tubular body, the piston sealingly dividing the tubular body into front and back tubular portions on opposite sides of the piston, the back tubular portion extending longitudinally from the piston to the seal, the piston being longitudinally movable within the tubular body between spaced-apart back and front positions of the piston, the piston moving towards the front of the tubular body when moving from the back position to the front position, the piston rod being conjointly movable with the piston, the piston rod extending longitudinally from the piston and into the back tubular portion of the tubular body, the piston rod comprising a hollow interior, the tubular body and the piston rod being spaced apart from one another along the longitudinal axis of the piston rod, the interior of the piston rod not being in fluid communication with the back tubular portion of the tubular body when the piston is in the back position and the interior of the piston rod being in fluid communication with the back tubular portion of the tubular body when the piston is in the front position,
   an expandable leak-sealing means being attached to the piston and in fluid communication with the interior of the piston rod, the leak sealing means being disposed in the front tubular portion of the tubular body, the fluid sealing means being disposed in a storage position when the piston is in the back position and being disposed in a sealing position when the piston is in the front position, wherein the leak sealing means is not expanded or expanded only slightly when in its storage position, and
   one fluid connection having an intake opening being disposed to receive fluid and a discharge opening that opens into the back tubular portion of the body when the piston is in the back position;
   wherein when a source of pressurized fluid is fluidly connected to the intake opening of the one fluid connection when the piston is in the back position:
      the source of pressurized fluid is not fluidly connected with the interior of the piston rod,
      the source of pressurized fluid pressurizes the back tubular portion of the tubular body, and urges the piston from the back position and to the front position, and
      when the piston reaches the front position the pressurized back tubular portion is fluidly connected to the interior of the piston rod and the leak sealing means the source of pressurized fluid at least partially fills the leak-sealing means through the piston rod.

2. The leak-sealing device as in claim 1, wherein the leak-sealing means is completely inside the carrier unit when in the stored position, and in which the leak-sealing means is at least partially outside the carrier unit when in the sealing position.

3. The leak-sealing device as in claim 1, further comprising at least one release unit for holding the leak-sealing device and being configured for selectively connecting a source of pressurized fluid to the intake opening of the one fluid connection.

4. The leak-sealing device as in claim 1, in which the intake opening of the one fluid connection can be connected to a fluid supply line.

5. The leak-sealing device as in claim 1, wherein the piston rod extends from the piston and through the seal, the piston rod comprising a fluid inlet extending from an inlet opening on the outer periphery of the piston rod to a discharge opening that opens into the interior of the piston rod, the piston rod fluid inlet being outside of the back tubular portion of the tubular body when the piston is in the back position, and the piston rod fluid inlet being disposed in the back tubular portion of the tubular body when the piston is in the forward position whereby the piston rod fluid inlet fluidly communicates the back tubular portion of the body with the interior of the piston rod when the piston is in the forward position.

6. The leak-sealing device as in claim 1, wherein the piston is located at the front end of the tubular body when the piston is in the forward position.

7. The leak-sealing device as in claim 1, further comprising at least one insertion aid for insertion of the leak-sealing device into the leak, which, when the leak-sealing means is in the storage position, at least partially surrounds the leak-sealing means and, when the leak-sealing means is in the sealing position, permits filling of the leak-sealing means.

8. The leak-sealing device as in claim 7, in which the at least one insertion aid comprises at least one sliding tip and at least one sliding shell for inserting the leak-sealing device into the leak.

9. The leak-sealing device as in claim 1, further comprising at least one recoil protection device for securing the leak-sealing device in a container, in particular in a pipe, wherein the recoil protection device is provided releasably connectable to the leak-sealing device.

10. The leak-sealing device as in claim 9, in which the recoil protection device comprises at least two self-clamping or clamping retaining arms, said retaining arms being spring-loaded, pretensioned and/or formed with a slip-resistant surface.

11. The leak-sealing device as in claim 1 further comprising a connection interface for mounting on a stand or mount.

12. The leak-sealing device as in claim 11, further comprising a mount or stand on which the leak-sealing device is mountable.

13. A system for sealing a leak in a container, tank and/or pipe comprising a leak-sealing device as in claim 1, and a fluid supply device provided with a release unit for fluid supply.

14. Use of a leak-sealing device as in claim 1 for sealing a leak in a container, tank and/or pipe.

15. A method for sealing a leak in a container, tank and/or pipe comprising the steps of:
inserting a leak-sealing device as in claim 1 at least partially into a leak in the container, tank and/or pipe, at least partially filling and expanding the leak-sealing means such that the leak-sealing means is pressurized from the inside of the container, tank and/or pipe, and presses the leak sealing means against an inner wall of the container, tank and/or pipe and thereby seals the leak.

16. The leak sealing device of claim 1 wherein the sealing means is a balloon.

17. The leak sealing device of claim 1 comprising a recoil device being configured to resist recoil of the piston from the forward position of the piston to the back position of the piston, the recoil device comprising a rear portion of the tubular body extending longitudinally from the seal to the back end of the tubular body, a spring-loaded member being movably mounted to the rear portion of the tubular body, the member being urged against the piston rod when the piston is in the back position, the member being urged into the path of movement of the piston rod as the piston moves from the front position to the back position to engage the piston rod and resist movement of the piston to the back position of the piston.

18. The leak sealing device of claim 1 comprising a pressure relieve valve mounted on the tubular body between the seal and the back position of the piston, the valve being in fluid communication with the back tubular portion of the tubular body, the valve being normally closed and being configured to open when the pressure in the back tubular portion exceeds a threshold pressure to discharge fluid from the back tubular portion.

19. The leak sealing device of claim 1 comprising a through hole in the piston, the through hole fluidly connecting the interior of the piston rod with the fluid sealing means or the through hole surrounding a mechanical connection fluidly connecting the interior of the piston rod with the fluid sealing means.

20. The leak sealing device of claim 1 comprising a trigger operable to selectively fluidly connect the one fluid inlet with a source of pressurized fluid.

21. The leak sealing device of claim 20 comprising a source of pressurized fluid, the pressurized fluid held in a cartridge connected to the tubular body for conjoint movement with the tubular body.

22. The leak sealing device of claim 1 wherein a source of pressurized fluid is fluidly connected to the intake opening of the one fluid connection and the source of pressurized fluid is not in fluid communication with the interior of the piston rod.

* * * * *